No. 850,540. PATENTED APR. 16, 1907.
W. W. PARSONS.
DEVICE FOR LOCKING BOLTS.
APPLICATION FILED JAN. 9, 1907.
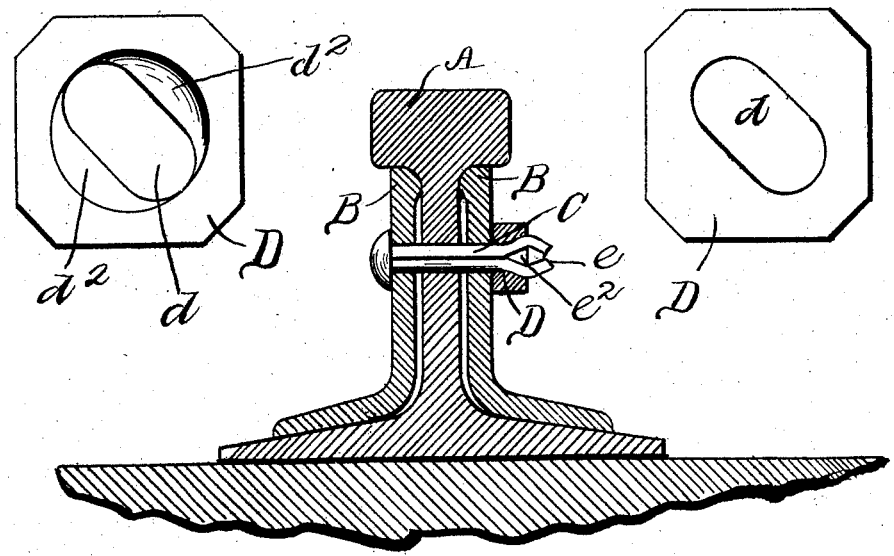
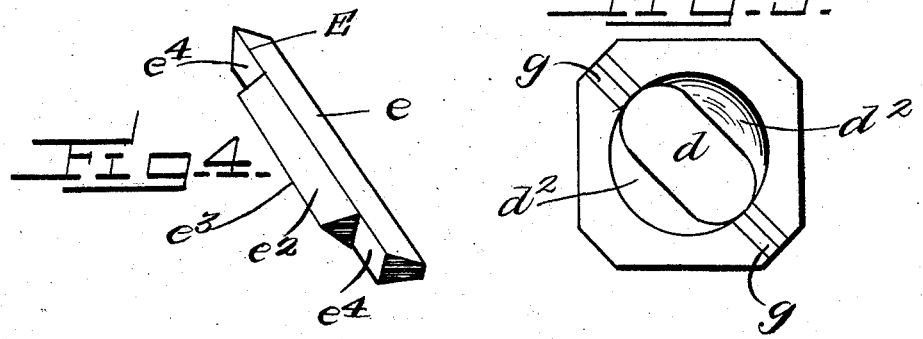
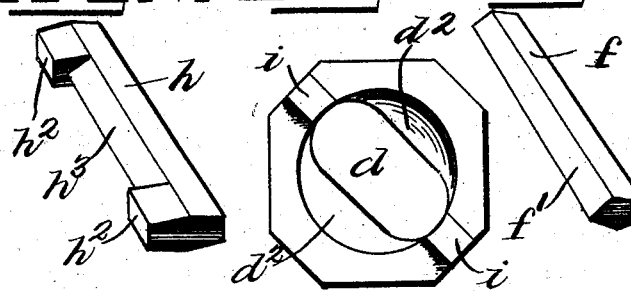
Inventor,
Wallace Williard Parsons,
by R. S. Dyrenforth,
his attorney
Witnesses
Philip Lezzell
O. V. Brandenburg.

UNITED STATES PATENT OFFICE.

WALLACE WILLIARD PARSONS, OF WASHINGTON, DISTRICT OF COLUMBIA.

DEVICE FOR LOCKING BOLTS.

No. 850,540.  Specification of Letters Patent.  Patented April 16, 1907.

Application filed January 9, 1907. Serial No. 351,507.

*To all whom it may concern:*

Be it known that I, WALLACE WILLIARD PARSONS, a citizen of the United States, residing at Washington, in the District of Columbia, have invented certain new and useful Improvements in Devices for Locking Bolts; and I do hereby declare the following to be a full, clear, and exact description of the invention, such as will enable others skilled in the art to which it appertains to make and use the same.

In an application for patent filed by me on December 8, 1906, Serial No. 346,940, for improvements in retaining-keys for split bolts in structural iron-work I have disclosed a form of retaining-key and a nut or collar for a bolt which, while most admirably adapted for the purposes and objects which I had in view and as set forth in said application, I have yet found capable of improvement.

The specific features of improvement reside in the fact that by the construction of the collar or nut of my previous said application after the bolt has once been locked by closing the ends of the split bolt over the retaining-key it is impossible by simply opening up such ends of the bolt or by spreading them apart again to withdraw the bolt from the structural iron-work if for any reason it be desired so to do without damage to the bolt and collar and the danger of jarring loose other locked bolts in the vicinity. Again, I have discovered that it is not necessary to construct the wedge so that it may be driven down between the ends of the bolt to a distance which will spread the separated ends of the bolt inside the cone-shaped opening of the collar against the walls of such opening of the collar. Therefore the objects of my present invention are to provide, first, a nut or collar so peculiarly formed as will permit ready removal of the bolt therefrom after the bolt has been locked without damage to the bolt and nut or danger of jarring loose other locked bolts in proximity to the bolt to be removed, and, second, a mandrel or head-forming piece so constructed that it operates merely to open the ends of the split bolt, the remaining operation of closing the ends of the bolt over the mandrel to lock the bolt serving to spread the same inside the collar against the walls thereof.

With these objects in view and others appearing as the specification proceeds, the invention may be said to reside, generally speaking, in a nut or collar having a non-circular or a substantially oblong opening therethrough and a mandrel or head-forming piece having a short wing and, more specifically, in certain details of construction hereinafter set forth.

In the accompanying drawings, Figure 1 is a transverse section through a railway-rail and fish-plates, my improvements being shown applied to the bolt to lock the same. Fig. 2 is a top plan view of one form of collar. Fig. 3 is a bottom plan view thereof. Fig. 4 is a perspective view of the mandrel or head-forming piece. Fig. 5 is a top plan view of still another slightly-modified form of collar. Fig. 6 is a perspective view of a slightly-modified form of mandrel adapted for use in connection with the form of collar disclosed in Fig. 5. Fig. 7 is a perspective view of a slightly-modified form of mandrel. Fig. 8 is a top plan view of still another slightly-modified form of collar adapted for use with the mandrel shown in Fig. 7; and Fig. 9 is a collective view of four modified forms of collar, the same illustrating some of the many forms of openings that I may make in the nut.

Referring to the drawings in detail, and first to Figs. 1, 2, and 4 thereof, A indicates an ordinary railway-rail, B B the customary fish-plates, and C a split or two-membered bolt passing through the rail and fish-plates and carrying a threadless collar D, which is provided with a non-circular or substantially oblong opening $d$ therethrough. On one face of the nut the walls of the opening may be cut away or dished out, as shown at $d^2 d^2$, Fig. 2, making a substantially circular opening on this face for a purpose presently appearing.

One form of mandrel or head-forming piece of my present invention (designated generally by E) comprises an elongated head $e$ and a short wedge-shaped wing $e^2$, extending from the head and terminating in a sharp or knife edge $e^3$, and the head may extend beyond the wing at each end, as shown at $e^4 e^4$, so as to engage the face of the collar D outside the opening thereof. In operation the function of this mandrel is initially simply to open up or spread apart the ends of the split bolt, and it does not serve to spread the bolt against the walls of the opening $d$ of collar D, inasmuch as the mandrel, as will be noticed, does not extend far enough into or between the ends of the bolt for this purpose, and I have found that in the operation of closing the ends of the bolt over the mandrel the bolt will be forced against the dished-out portion $d^2$ $d^2$ of the collar, but not until the collar is firmly seated. The other function of the mandrel is to permit the ends of the bolt to be turned thereover, forming a head and constituting a lock to hold the collar and bolt in place. When it is desired for any purpose to remove a bolt which has thus been locked, it is necessary merely to force open the ends of the bolt, remove the mandrel, and turn the collar somewhat with a wrench or the like appropriate tool until the bulges of the bolt which have occupied the dished-out portions $d^2$ $d^2$ of the collar are in line with the elongated opening, whereupon a slight tap on the end of the bolt will drive it through the opening without injuring the bolt and collar or jarring loose other bolts in the vicinity. This is impossible with the collar of my previous application for patent mentioned, and this feature, therefore, of my present invention is very valuable and makes it exceedingly advantageous for use on railway-rails or in metal or iron work of any kind.

Referring now to Fig. 5, this discloses a slightly-modified form of collar differing from the collar of Fig. 2 in that it is provided additionally with a V-shaped channel $g$ in cross-section in the upper face of the collar. The purpose of this V-shaped groove is for permitting easy removal of a mandrel, such as shown in Fig. 6, which discloses a slightly-modified form of mandrel, in which $f$ is a head and $f'$ a wing extending therefrom and terminating in a sharp knife-edge. It will be noted that in this form of mandrel the wing extends entirely to the ends of the head, differing in this respect from the form of mandrel shown in Fig. 4. It will be seen that the ends of the wing $f'$ rest in the V-shaped groove $g$ and that when the bolt has been locked by turning the split ends thereof over the mandrel and it be desired at any time to remove the mandrel and unlock the bolt all that is necessary to be done is to spread apart slightly the closed ends of the bolt, whereupon the mandrel may be driven out sidewise through the V-shaped groove. This permits more expeditious unlocking of the bolt than the device disclosed in the constructions of Figs. 2 and 4 and for certain situations and under particular exigencies is preferred for this purpose.

Referring now to Figs. 7 and 8, showing slightly-modified forms of mandrel and collar, respectively, it will be noted that the mandrel is formed with a head $h$ with two downturned lugs $h^2$ $h^2$ extending therefrom and disposed at each end of the head, and with a wedge-shaped wing $h^3$, also extending from the head on the same side as the lugs and disposed between the lugs and terminating in a sharp or knife edge, as shown. The collar adapted to coöperate with this form of mandrel differs from the form disclosed in Fig. 2 in that it is provided, additionally, with upstanding abutments or rests $i$ $i$, disposed on the upper face of the collar and adapted to support the mandrel by the lugs $h^2$ $h^2$ thereof resting thereupon, the ends of the split bolt being turned over the mandrel, as before, to lock the device.

Having thus fully described my invention, what I claim as new, and desire to secure by Letters Patent, is—

1. A collar or nut for use on bolts, having a threadless, elongated channel or opening extending from one face of the collar partly therethrough, and from thence having the longer sides, in cross-section, of the channel flaring, and having the opening terminating in a circular form, in cross-section, on the other face of the collar; for the purposes described.

2. In combination with a split bolt, a collar or nut thereon having a threadless, elongated channel or opening extending from one face of the collar partly therethrough, and from thence having the longer sides, in cross-section, of the channel flaring, and having the opening terminating in a circular form, in cross-section, on the other face of the collar; for the purposes described.

3. In combination with a split bolt, a collar or nut thereon having a threadless, elongated channel or opening extending from one face of the collar partly therethrough, and from thence having the longer sides, in cross-section, of the channel flaring, and having the opening terminating in a circular form, in cross-section, on the other face of the collar, and means for locking the collar on the bolt.

4. In combination with a split bolt, a collar or nut thereon having a threadless, elongated channel or opening extending from one face of the collar partly therethrough, and from thence having the longer sides, in cross-section, of the channel flaring, and having the opening terminating in a circular form, in cross-section, on the other face of the collar, and a mandrel for forcing apart the ends of the bolt.

5. In combination with a split bolt, a collar or nut thereon having a threadless, elongated channel or opening extending from one face of the collar partly therethrough, and from thence having the longer sides, in cross-section, of the channel flaring, and having the opening terminating in a circular form, in cross-section, on the other face of the collar, and a mandrel for forcing apart the ends of the bolt and formed with an elongated head and a wedge-shaped wing extending therefrom.

In testimony whereof I affix my signature in the presence of two subscribing witnesses.

WALLACE WILLIARD PARSONS.

Witnesses:
E. T. BRANDENBURG,
J. F. BRANDENBURG.